US007675936B2

(12) United States Patent
Mizutani et al.

(10) Patent No.: US 7,675,936 B2
(45) Date of Patent: Mar. 9, 2010

(54) PASSIVE OPTICAL NETWORK (PON) SYSTEM

(75) Inventors: Masahiko Mizutani, Kokubunji (JP); Takeshi Shibata, Yokohama (JP); Tohru Kazawa, Kokubunji (JP); Yoshihiro Ashi, Yokohama (JP); Masanobu Kobayashi, Yokohama (JP); Hideki Endo, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 11/492,832

(22) Filed: Jul. 26, 2006

(65) Prior Publication Data

US 2007/0223490 A1 Sep. 27, 2007

(51) Int. Cl.
*H04J 3/16* (2006.01)
*H04J 3/22* (2006.01)

(52) U.S. Cl. ....................... 370/466; 370/390; 370/401; 370/432; 398/58; 398/48; 398/51; 398/54

(58) Field of Classification Search ................ 370/466, 370/390, 401, 432; 398/58, 48, 51, 54
See application file for complete search history.

(56) References Cited

U.S. PATENT DOCUMENTS 7,031,343 B1 * 4/2006 Kuo et al. ................... 370/473
7,478,173 B1 * 1/2009 Delco ......................... 709/250
2005/0169270 A1 * 8/2005 Mutou et al. ................ 370/390
2006/0126659 A1 * 6/2006 Baum et al. ................. 370/466

FOREIGN PATENT DOCUMENTS

JP 2003-134174 7/2002
JP 2005-039825 7/2004

OTHER PUBLICATIONS

Gigabit-capable Passive Optical Networks (GPON): General characteristics, ITU-T Telecommunication Standardization Sector of ITU, Mar. 2003, G.984.1, pp. 1-14, 6 sheets.
Gigabit-capable Passive Optical Networks (GPON): Physical Media Dependent (PMD) layer specificaion, ITU-T Telecommunication Standardization Sector of ITU, Mar. 2003, G.984.2, pp. 1-29, 10 sheets.
Gigabit-capable Passive Optical Networks (GPON): Transmission convergence layer specification, ITU-T Telecommunication Standardization Sector of ITU, Feb. 2004, G.984.3, pp. 1-108, 29 sheets.

* cited by examiner

*Primary Examiner*—William Trost, IV
*Assistant Examiner*—Kyle C Kasparek
(74) *Attorney, Agent, or Firm*—Stites & Harbison, PLLC; Juan Carlos A. Marquez, Esq.

(57) ABSTRACT

A PON system capable of utilizing the bandwidth of an optical transmission channel in the PON section. In a PON system including an OLT and a plurality of ONUs, the OLT has: a downstream frame processing unit that removes at least part of the header information in a layer 2 header from a downstream frame received from a wide area network, and converts the remaining frame portion into a frame having a header specific to the PON section; and a downstream frame processing unit that extracts a downstream frame portion to be transferred to a user terminal, from a received frame from a PON, and adds the layer 2 header information deleted in the OLT.

9 Claims, 11 Drawing Sheets

FIG. 8

GEM HEADER TABLE 150

| DMAC (151) | PORT ID (152) |
|---|---|
| MULTICAST | ID (MULTI) |
| MAC111 | ID1 |
| ⋮ | ⋮ |
| MAC112 | ID1 |
| MAC21 | ID2 |
| ⋮ | ⋮ |

ONU 20-i

FIG. 10

ROUTING TABLE 240

| DMAC (241) | LINE NUMBER (242) |
|---|---|
| MAC11 | L11 |
| MAC12 | L11 |
| ⋮ | ⋮ |

FIG. 11

ARP TABLE 250

| IP ADDRESS (251) | MAC ADDRESS (252) |
|---|---|
| IP111 | MAC111 |
| IP112 | MAC112 |
| ⋮ | ⋮ |

FIG. 12

MULTICAST GROUP MANAGEMENT TABLE 260

| MULTICAST GROUP IP ADDRESS (261) | IP ADDRESS OF PARTICIPANTS (262) | VLAN-ID (263) | OTHERS (264) |
|---|---|---|---|
| GIP1 | IP111 | VLAN1 | |
| | IP121 | VLAN2 | |
| | ⋮ | ⋮ | |
| GIP2 | IP131 | VLAN3 | |
| | ⋮ | ⋮ | |
| ⋮ | ⋮ | ⋮ | |

PASSIVE OPTICAL NETWORK (PON) SYSTEM

CLAIM OF PRIORITY

The present application claims priority from Japanese application JP 2006-080537 filed on Mar. 23, 2006, the content of which is hereby incorporated by reference into this application.

FIELD OF THE INVENTION

The present invention relates to a Passive Optical Network (PON) system, and more specifically to a PON system that allows effective use of the transmission bandwidth of an optical transmission channel.

BACKGROUND OF THE INVENTION

As the Internet has become widely used and information services are provided through networks, the communication network occupies an important place in social infrastructure. With the increase in Internet access from homes and business locations of companies, faster and higher-capacity access lines are increasingly required that interconnect these communication sites and the communication stations of carrier networks.

As one of the access networks to be connected to a wide area network such as the Internet, there is a passive optical network (PON) in which a plurality of subscriber terminals can share an optical fiber. The PON systems are each installed at a user's site, and each system includes a plurality of optical network units (ONU) containing one or plural user terminals, and an optical line Terminal (OLT) connected to these ONUs via optical fiber networks. Optical fibers connected to the OLT are joined with branch optical fibers connected to each ONU by means of an optical splitter (optical coupler), and the optical transmission channel between the optical splitter and the OLT is shared by a plurality of ONUs (user terminals), thereby reducing the optical fiber installation cost substantially.

Known PON systems include the B-PON (Broadband PON) wherein information is transmitted by fixed-length ATM cells over the optical fiber section (PON section), the G-PON (Gigabit PON) enabling a fast data transfer on the order of gigabits, and the GE-PON (Gigabit Ethernet PON) suitable for an information transmission by Ethernet frames that is becoming popular for LANs and metro-networks.

The G-PON and the GE-PON allow variable-length frames to be transferred in the PON section, and their standardization and technological assessment is being made by the ITU-T and the IEEE respectively. ITU-T recommendations on the G-PON include the non-patent documents 1 through 3 below, wherein the GEM (G-PON Encapsulation Method) frame specification is defined as a transmission frame specification for transferring common variable-length frames, not restricted to Ethernet frames, in the PON section.

In a PON system, downstream frames from OLT to ONU are branched into plural branch optical fibers by a splitter to be delivered to all ONUs. Each ONU determines whether or not a received PON frame is one to be processed by itself, based on the destination identification information in the header (such as a GEM header), of the received PON frame. Upstream frames from ONU to OLT are multiplexed into the OLT-side optical fiber by an optical splitter. In upstream communications, in order to prevent overlapping of frames on the optical fiber, the TDMA scheme is employed that causes each ONU to send frames during a transmission time interval allocated by the OLT.

As can be understood from the above configuration, the PON system can be an access network suitable for delivering the same service information to a plurality of user terminals by multicasting it from the OLT. Accordingly, for the triple-play service (broadcasting, telephone, and data communications), which is drawing attentions recently, particularly for the broadcasting industry seeking to enter into the network business, the PON system plays an important role as an access network.

Non-patent document 1: ITU-T G.984.1 "Gigabit-capable Passive Optical Networks (GPON): General characteristics"

Non-patent document 2: ITU-T G.984.2 "Gigabit-capable Passive Optical Networks (GPON): Physical Media Dependent (PMD) layer specification"

Non-patent document 3: ITU-T G.984.3 "Gigabit-capable Passive Optical Networks (GPON): Transmission convergence layer specification"

SUMMARY OF THE INVENTION

However, in the PON system, part of the optical fiber section is shared by a plurality of ONUs, and consequently while a frame destined for a particular ONU (or user terminal) is transferred in the PON section, a frame destined for another ONU cannot be transferred. Also, if data frames with the same content are repeatedly transmitted from the OLT, the bandwidth utilization rate of the transmission channel is increased compared with a network composed of common transmission nodes such as routers and switches.

Accordingly, the PON system requires the frame transfer using the optical transmission channel bandwidth effectively, and for the information that can be shared by many users, such as a broadcast program, it is desirable to multicast the information to a plurality of ONUs in a single frame transmission, rather than to transmit the frames with the same content to individual ONUs. In the B-PON and GE-PON, when the OLT multicasts one frame to a plurality of ONUs, a destination identifier (multicast port ID or logical link ID) predetermined in the PON section is set in the header of a PON transmission frame.

When the PON system is used as an access network to a wide area network, the OLT is connected to routers belonging to the wide area network or ISP network, and each user terminal communicates with an arbitrary server (or computer system) on the wide area network via the ONU, OLT, and routers. In this case, a packet destined for a user terminal is input to the OLT with the packet being encapsulated in the header (hereinafter referred to as L2 header) of the data link layer of the OSI reference model required for communications between the router and a user terminal.

In the conventional PON system, the OLT encapsulates an entire frame received from a router in a wide area network in a protocol header specific to the PON section, for example the GEM header, and transmits the frame to an optical fiber. That is, the payload of a GEM frame transferred in the PON section contains an entire frame having the L2 header received from the router. When a received frame contains the PPP header between L2 header and IP packet, the payload of a GEM frame contains the PPP header.

However, each ONU of the G-PON determines whether a received GEM frame is deleted or relayed to a user terminal or the ONU controller based on a value of the port ID in the GEM header of a received frame, and the L2 header and PPP header contained in the payload of a GEM frame do not contribute at all to the frame transmission control in the PON section.

An object of the present invention is to provide a PON system capable of effectively utilizing the communication bandwidth of optical transmission channels in the PON section.

To achieve the above object, a PON system of the present invention is characterized in that the transfer frame length in the PON section is shortened by removing the header information that do not contribute to the frame transmission control in the PON section.

Describing in further detail, the PON system of the present invention is characterized by that: the OLT has a downstream frame processing unit that removes at least part of the header information from a downstream frame received from a node equipment of a wide area network, and converts the remaining portion of the frame into a frame having a header specific to the PON section; and the ONU has a downstream frame processing unit that extracts a downstream frame portion to be transferred to a user terminal from a frame received from a passive optical network, and supplements it with the header information deleted in the OLT.

A downstream frame includes a layer 2 header of the OSI reference model and an IP packet, and if the layer 2 header is, for example, an Ethernet header, the down stream frame processing unit of the OLT removes at least the destination MAC address, source MAC address, and protocol type from the layer 2 header.

In this case, the downstream frame processing unit of each ONU adds at least the destination MAC address, source MAC address, and protocol type of the L2 header in the content of the payload of a received frame from the passive optical network. If the header information other than the layer 2 header can be regenerated in the downstream frame processing unit of an ONU, it is possible to further reduce the length of a transmission frame in the PON section, by removing other header information as well as the layer 2 header information in the downstream frame processing unit of the OLT.

In one embodiment of the present invention, the downstream frame processing unit includes: a frame analysis unit that analyzes a downstream frame received from a communication equipment of a wide area network, removes at least part of the header information, and outputs the remaining frame portion; and a frame generation unit that converts the frame portion output from the frame analysis unit into a frame having a header specific to the PON. The frame analysis unit may be made to remove the header information from a particular downstream frame identified based on the content of the layer 2 header, for example, a downstream frame containing a multicast address as destination address.

In a PON system of the present inventions, the downstream frame processing unit of each ONU determines whether or not a downstream frame to be processed in itself is included, based on the identification information in a header specific to the PON section, and deletes a received frame that needs not to be processed. Also, if the OLT removes, for example, the header information of a downstream frame containing a multicast IP packet, the downstream frame processing unit of the ONU determines whether or not a received frame contains a multicast IP packet, based on the identification information in the PON section-specific header, and if the received frame contains a multicast IP packet, adds the header information removed on the transmitter side.

In one embodiment of the present invention, each ONU has a management table in which the addresses of participant user terminals for each multicast group, the downstream frame processing unit of each ONU determines whether or not a received frame contains a multicast IP packet based on the identification information in the PON section-specific header, and if the received frame contains a multicast IP packet the above management table is referenced based on the destination IP address of that multicast IP packet, and if no participant user terminal address is registered in the multicast group identified by the destination IP address the received frame is deleted.

According to the present invention, by removing unnecessary information from a transferred frame in the PON section and thereby reducing the transferred frame length, it is possible to utilize the bandwidth of the PON section effectively in optical communications.

BRIEF DESCRIPTION OF THE DRAWINGS

FIG. 8 is a diagram showing a GEM header table that the downstream analysis unit 122 references;

FIG. 10 is a diagram showing an exemplary internal routing table 240 that the ONU 20-*i* references;

FIG. 11 is a diagram showing an exemplary ARP table 250 that the ONU 20-*i* references;

FIG. 12 is a diagram showing an exemplary multicast group management table 260 that the ONU 20-*i* references.

DETAILED DESCRIPTION OF THE PREFERRED EMBODIMENTS

Figure 1:
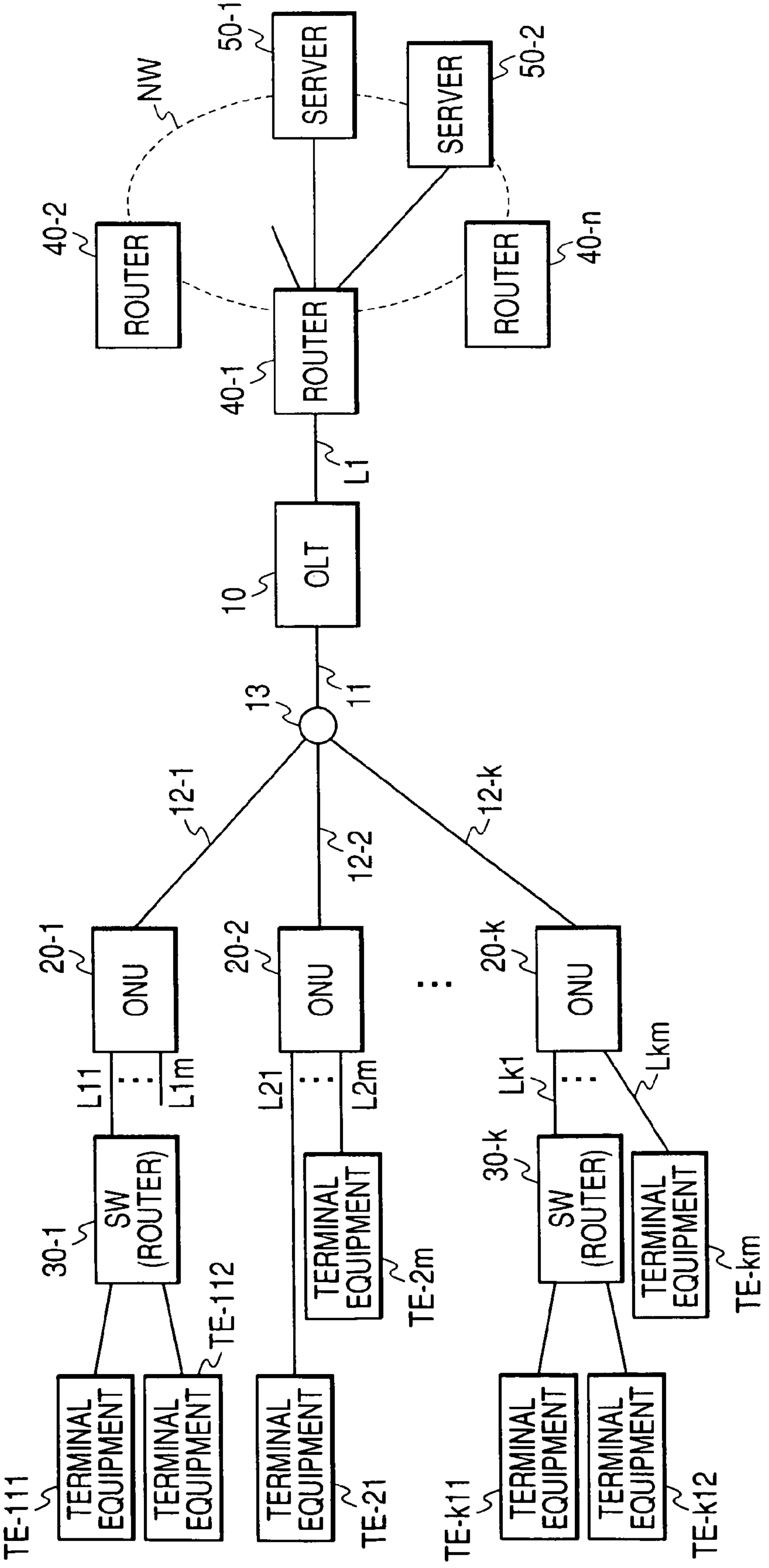
FIG. 1 is a configuration diagram of a PON system according to the present invention.

FIG. 1 is a configuration diagram of a PON system according to the present invention.

A PON system includes an optical line terminal (OLT) 10, a plurality of optical network unit (ONU) 20 (20-1 through 20-*k*), and an optical fiber network interconnecting these elements in the PON section. The optical network in the PON section includes an optical fiber 11 connected to the OLT 10 and one or more branch optical fibers 12-*i* (i=1 to k) connected to each ONU 20-*i*, and the branch optical fiber 12-*i* is branched from the optical fiber 11 by an optical splitter (optical coupler) 13.

The OLT 10 is typically installed in a user line concentration station owned by a carrier or ISP (Internet Service Provider), the ONU 20-*i* (i=1 to k) is installed in an office or residential building or at a user's house. Although descriptions below of the embodiments assume that the G-PON (Gigabit PON) is employed as a communication protocol for the PON section, the present invention is also effective where another communication protocol, such as the GE-PON (Gigabit Ethernet PON) is employed for the PON section.

Each ONU 20-*i* has a plurality of user connection lines Lij (j=1 to m) and houses a plurality of user terminals TE via connection ports. The user terminal is either connected to the ONU 20-1 (ONU 20-*k*) through, for example, a customer premises router or customer premises switch 30-1 (30-*k*), as shown for the TE-111 and TE-112 (TE-k11, TE-k12), or directly connected to the ONU 20-2 (ONU 20-*k*) as shown, for example, for the TE-21 and TE-2*m* (TE-km).

The NW represents a wide area network (including an ISP network) composed of a plurality of routers 40 (40-1 to 40-*n*).

Each user terminal TE connected to a PON system communicates with a server 50 (50-1, 50-2) connected to a wide area network NW, via ONU 20-*i*, OLT 10, and router 40-1. Although the server 50-1 and 50-2 are directly to the router 40-1 for simplicity, in FIG. 1, another router may exist between the server 50-1 or 50-2 and the router 40-1 in a practical network. Also, the network NW has many other servers accessible from each user terminal in addition to the servers 50-1 and 50-2, but these servers are not shown in FIG. 1.

The OLT 10, when a frame is received that is sent from, for example, the server 40-2 to the user terminal TE-11 via the router 40-1 over the communication line L1, converts the received frame into a frame format (GEM frame for the G-PON) conforming to a transmission protocol specific to the PON section, and sends it to the optical fiber 11. In the PON section, a downstream frame sent to the optical fiber 11 by the OLT 10 is branched into the branch optical fibers 12-1 to 1-12 and then broadcast to all the ONUs 20-1 to 20-*k*.

To each ONU 20-*i*, a unique port ID within the PON is allocated. Each ONU refers to destination identification information (port ID) in the header (GEM header for the G-PON) of a received frame, processes a frame whose destination identification information agrees with the own port ID or indicates a multicast port ID, and deletes a received frame other that such a frame. GEM frames including the frames destined for the user terminal TE-111 has a GEM header containing a port ID specific to the ONU 20-1. Therefore, only the ONU 20-1 processes this GEM frame. The ONU 20-1 removes the GEM header from a GEM frame, and transfers the received frame to the connection line L11 to the user terminal TE-111, according to the destination information in the header of the received frame.

Meanwhile, an upstream frame from the ONU 20-1 to 20-*k* to the network NW are sent using a transmission time interval allocated to each ONU in advance by the OLT 10 in order to avoid collisions on the optical fiber 11, and reaches the OLT 10 in a state of being time-division multiplexed on the optical fiber 11. The OLT 10 transfers the upstream frame received from the optical fiber 11, after converting its format as needed.

Figure 2:
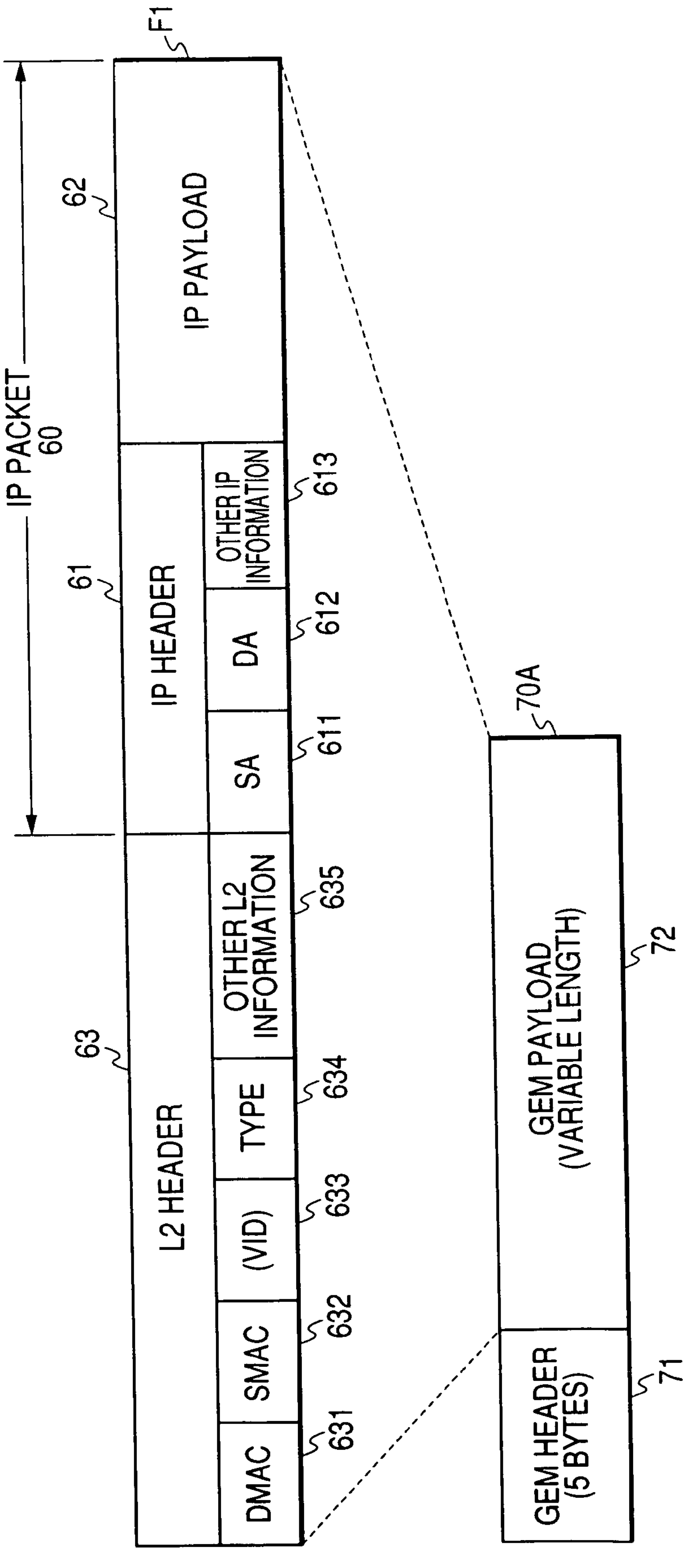
FIG. 2 is a diagram showing a format of an Ethernet frame F1 to be received from a wide area network, and that of GEM frame 70A to be transferred in the PON section.

FIG. 2 shows the format of a downstream frame F1 that the OLT 10 receives from the router 40-1 and the format of a downstream GEM frame 70A in the PON section, when the communication protocol between user terminal and ONU and that between OLT 10 and router 40-1 are Ethernet.

The frame F1 received from the router 40-1 includes an IP packet 60 and an L2 header 63. The IP packet 60 is made up of an IP header 61 and an IP payload 62. The IP header 61 contains a source IP address (SA) 611, a destination IP address (DA) 612, and other header information.

Here, the source IP address (SA) 611 of an IP header identifies the source of an IP packet, such as the IP address of the server 50-1, and the destination IP address (DA) 612 identifies the IP address of a user terminal to which an IP packet is transmitted.

In this embodiment, the L2 header 63 is an Ethernet header and contains a destination MAC address (DMAC) 631, a source MAC address (SMAC) 632, protocol type 634, and other header items 635. In the protocol type 634 representing the type of a packet, which follows the L2 header, a value indicating an IP packet has been set in this embodiment. The DMAC 631 identifies the MAC address of a user terminal to which an Ethernet frame is transmitted, and the SMAC identifies the router 40-1 from which an Ethernet frame is transmitted. In order to increase communications security, when a user terminal sends or receives a frame by using a VLAN (Virtual LAN) formed between that user terminal and the router 40-1, the L2 header 63 contains a VLAN identifier (VID) 633.

A downstream GEM frame 70A in the PON section includes a 5-byte GEM header 71 and a variable-length GEM payload 72. Downstream frames on the PON section undergo a reception control according to the port ID contained in the GEM header 71. In the prior art, the OLT 10 sets the frame F1 received from the router 40-1 in the GEM payload 72, and sets in the GEM header a port ID to specify an ONU by which the frame F1 is to be received. Also, when the received frame F1 from the router 40-1 is a multicast frame to be received by all the ONUs connected to the optical fiber 11, the OLT 10 sets the frame F1 received from the router 40-1 in the GEM payload 72, and sets in the GEM header 71 a predetermined port ID for multicast.

Figure 3:
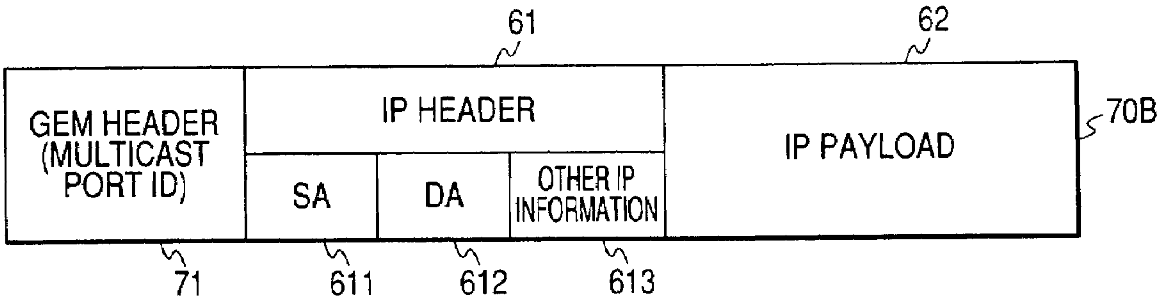
FIG. 3 is a diagram showing an exemplary format of an abbreviated GEM frame according to the present invention.

This embodiment is characterized by that, when the frame F1 received from the router 40-1 is a multicast frame, the OLT 10 deletes the L2 header that will not contribute to the reception control of a downstream frame in the PON section, and thereby transmits an abbreviated GEM frame 70B having an IP packet alone in the GEM payload 72 to the ONU 20-1 to ONU 20-*k*, as shown in FIG. 3. However, the L2 header needs not to delete the header entirely and some header information items may be left. The L2 header deleted by the OLT 10 is regenerated in each ONU 20 and then transferred to a user terminal as a frame with an L2 header, as described below.

Figure 4:
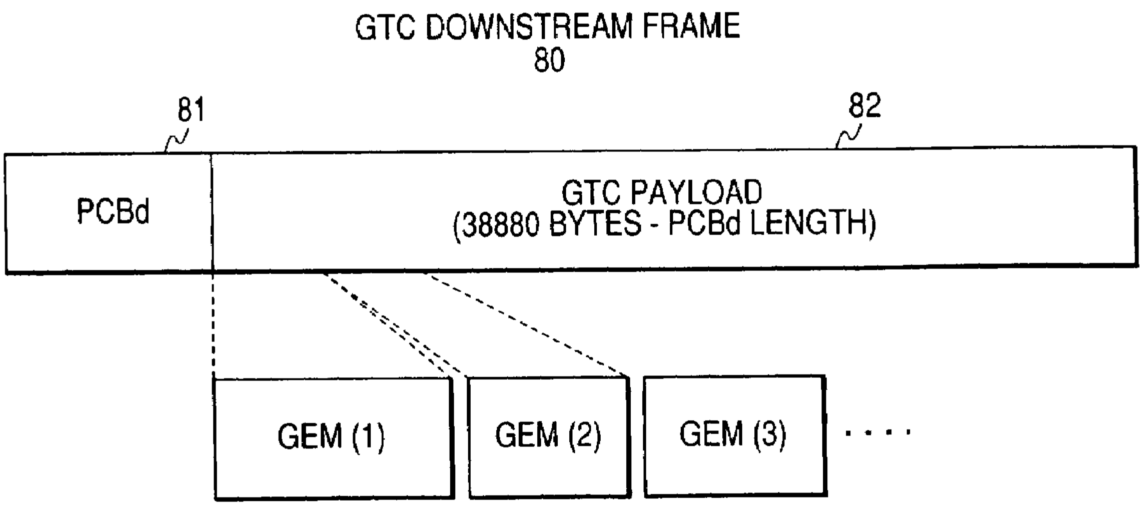
FIG. 4 is a diagram for explaining the relationship between a GTC downstream frame and a GEM frame in the PON section.

FIG. 4 shows the format of a GTC (G-PON Transmission Convergence) downstream frame 80 to be sent from the OLT 10 to the optical fiber 11.

The GTC downstream frame 80 includes a PCBd (Physical Control Block downstream) 81 as a header and a GTC payload 82. In a 2.4 Gbps PON system, the total length of the GTC downstream frame 90 is 38880 bytes.

The GEM frame described in FIGS. 2 and 3 is mapped to the GTC payload 82 as shown in GEM(1) and GEM(2) of FIG. 4. The length of the GTC payload 82 is "38880—PCBd length".

According to this embodiment, the multicast GEM frame length is shortened by removing the L2 header (Ethernet header), and therefore it is possible for the OLT 10 to communicate with the ONU 20-1 to ONU 20-*k* by utilizing the GTC payload 82.

Figure 5:
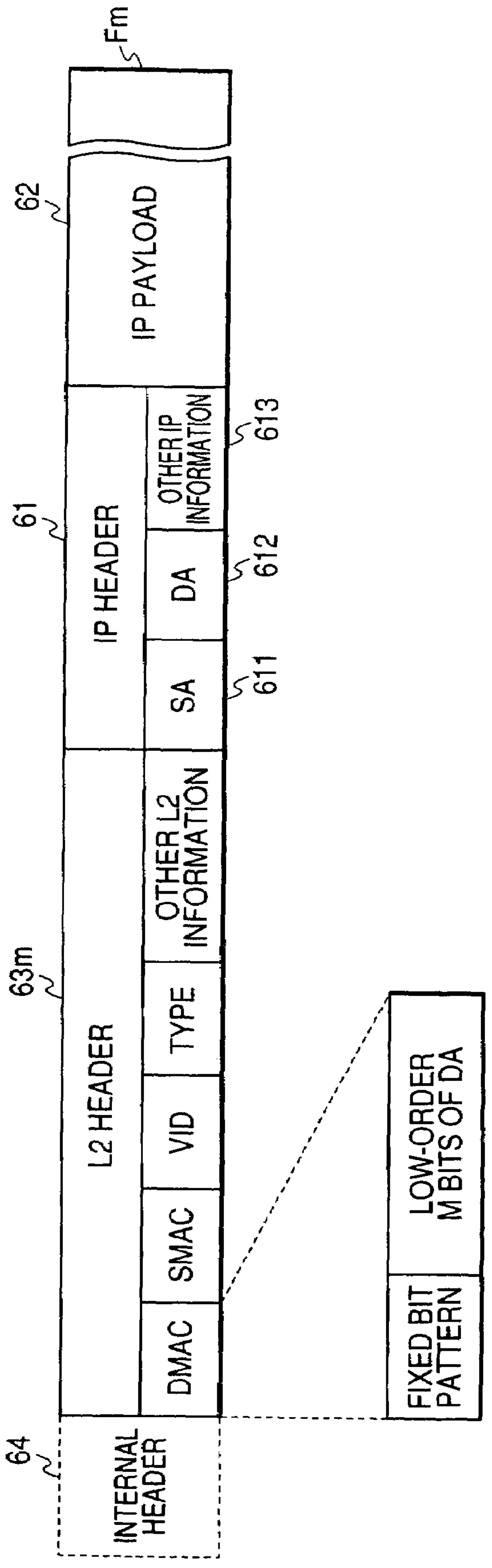
FIG. 5 is a diagram showing a format of an Ethernet frame regenerated in an ONU.

FIG. 5 shows the format of a multicast Ethernet frame Fm regenerated from a multicast GEM frame by each ONU 20-*i*.

Each ONU 20-*i*, on receipt of an abbreviated GEM frame 70B having a multicast port ID in the GEM header, extracts an IP packet 60 from the received frame and adds a newly generated L2 header to that IP packet, and thereby regenerates a multicast Ethernet frame Fm. The generation of an L2 header 63*m* by the ONU 20-1 is described later in detail. An internal header 64 shown by a dotted line contains internal routing information (line number Nij) required for selectively transmitting a frame Fm to the connection line Lij for a user terminal. To the connection line Lij identified by the line number Nij, a frame Fm without the internal header is sent.

Figure 6:
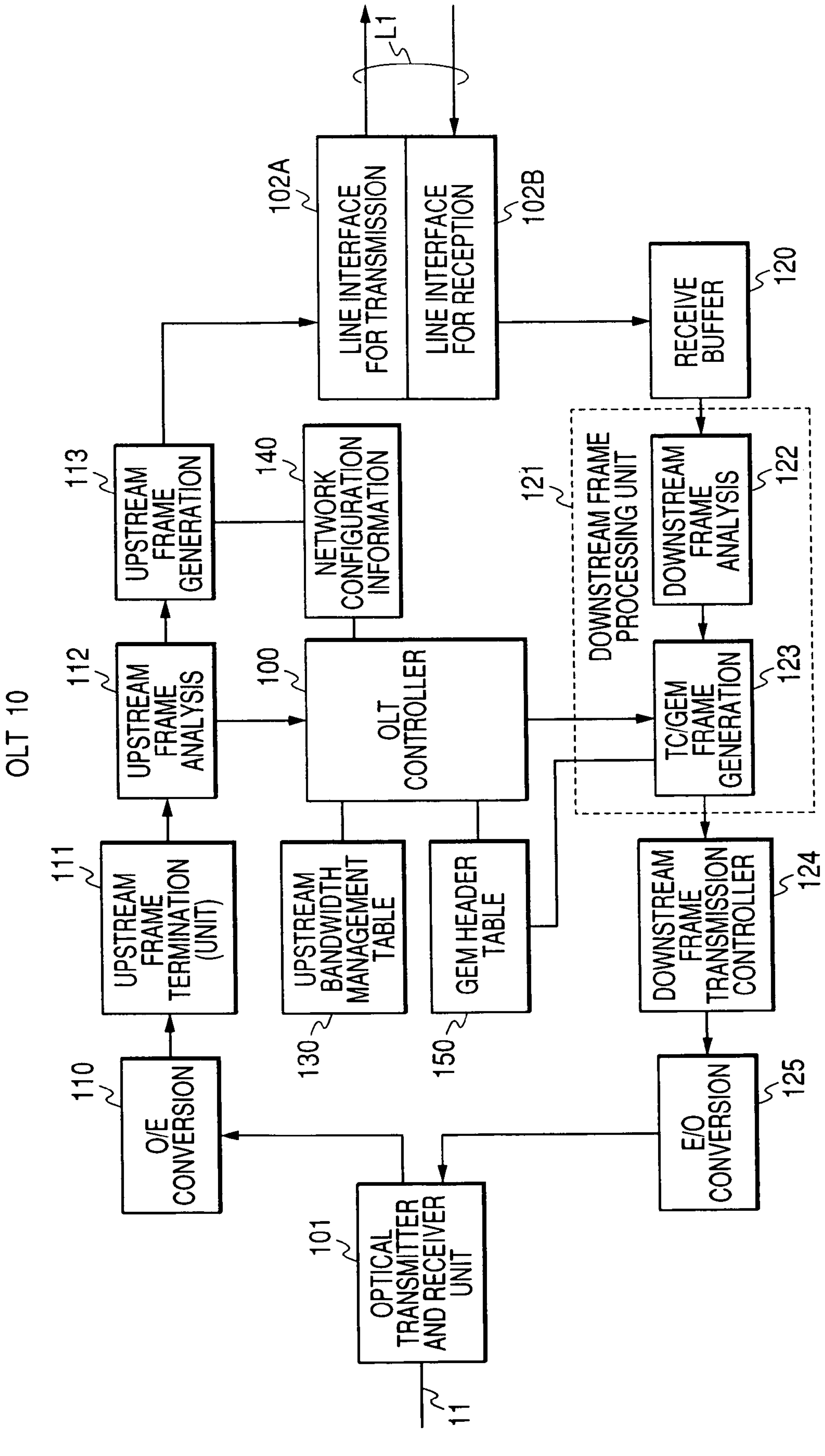
FIG. 6 is a block diagram showing an embodiment of an OLT 10 according to the present invention.

FIG. 6 is a block diagram showing one embodiment of the OLT 10.

The OLT 10 includes: an OLT controller 100; an optical transmitter and receiver unit 101 connected to the optical fiber 11; a line interface for transmission 102A and a line interface for reception both of which are connected to the line L1; an upstream signal processing circuit provided between the optical transmitter and receiver unit 101 and the line interface for transmission 102A; and a downstream signal processing circuit provided between the optical transmitter and receiver unit 101 and the line interface for reception 102B.

The upstream signal circuit includes: an O/E conversion unit 110 to convert an optical signal received by the optical transmitter and receiver unit 101 into an electric signal; an upstream frame termination unit 111 to regenerate an upstream frame fro an output signal of the O/E conversion unit 110; an upstream analysis unit 112 connected to the upstream frame termination unit 111; and an upstream generation unit 113 to convert a frame output from the upstream analysis unit 112 into the format conforming to a protocol on the communication line L1.

The upstream analysis unit 112 analyses a received upstream frame, outputs the received frame to the OLT controller 100 when it is a control frame for the PON section, and transfers the received frame to the upstream frame generation unit 113 when it is a user frame or a control frame to be transferred to the router 40-1.

The upstream generation unit 113 converts a received frame into an ATM cell when, for example, the protocol on the communication line L1 is ATM. The information required for conversion of a frame is read out from a network configuration information memory 140. In this embodiment, since the protocol on the communication line L1 is Ethernet and it is assumed that a received upstream frame is an Ethernet frame, the upstream frame generation unit 113 has only to transfer an Ethernet frame output from the upstream fame analysis unit 112 to the line interface for transmission 1024 without conversion.

However, as described below, if an upstream multicast frame is also made to be transferred with the L2 header removed in the PON section, the upstream generation unit 113 generates an L2 header based on the network configuration information stored in the memory 140 and, after converting a received frame into an Ethernet frame, transfer it to the line interface for transmission 102A.

The downstream processing circuit includes: a receive buffer to temporarily store a downstream frame that the line interface for reception 102B received from the communication line L1; a downstream frame processor 121 that converts a downstream frame read out from the receive buffer 120 into a frame format specific to the PON section and output it; a downstream frame transmission controller 124 connected to the frame processor 121; and an E/O conversion unit 125 that converts a frame output from the downstream frame transmission controller 124 into an optical signal to output to the optical transmitter and receiver unit 101.

The downstream processor 121 includes: a downstream frame analysis unit 122 that analyzes a downstream frame read out from the receive buffer 120 and removes the header information according to the present information (L2 header, in this embodiment); and a TC/GEM frame generator 123 that convert a frame output from the downstream frame analysis unit 122 and a control frame supplied from the OLT controller 100 into GEM frames and outputs them in TC frame format (GTC frame, in this embodiment).

Figure 7:
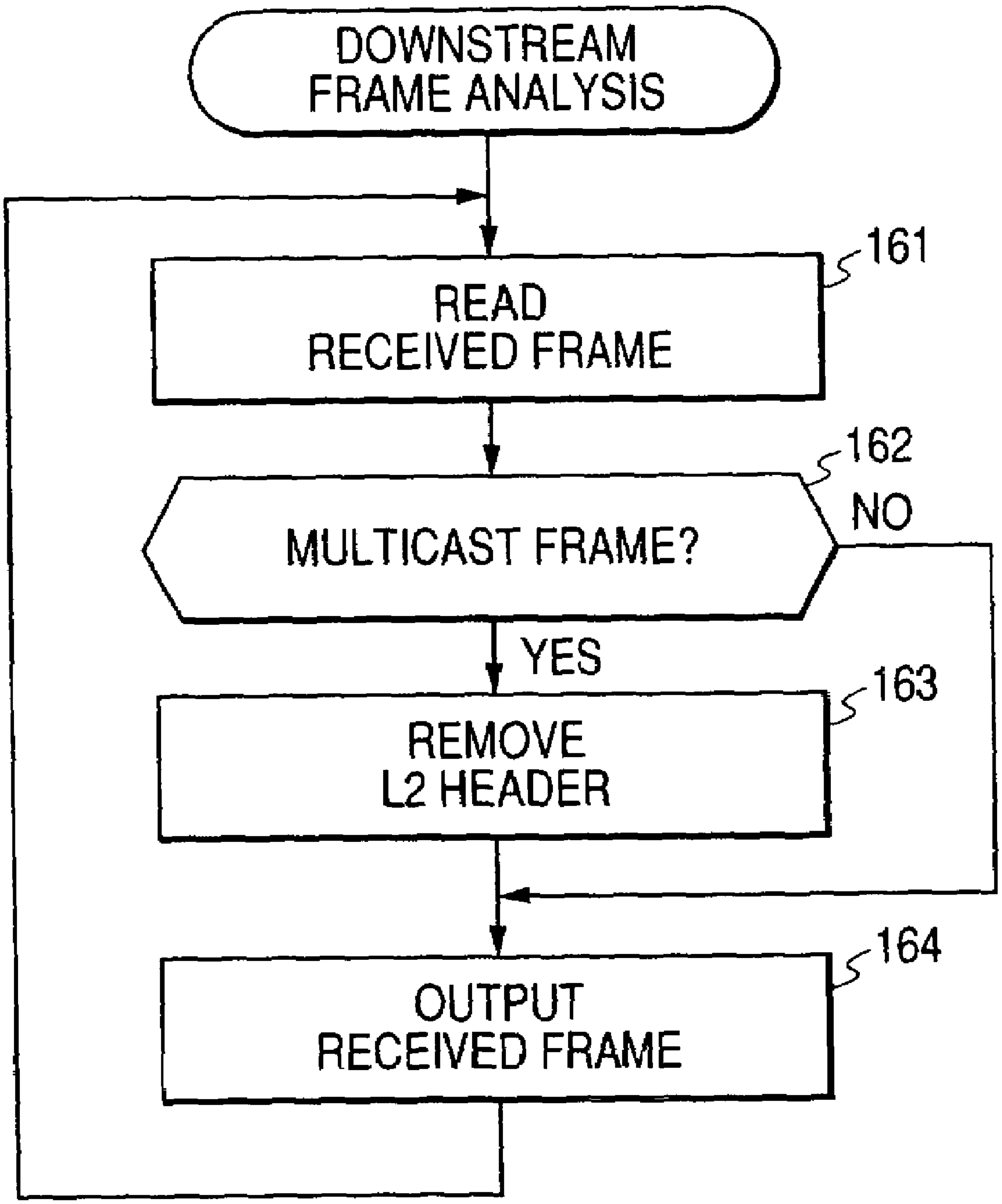
FIG. 7 is flowchart showing the operation of a downstream frame analysis unit 122 of the OLT 10.

As shown in the flowchart in FIG. 7, the downstream frame analysis unit 122 reads out a received frame from the receive buffer 120 (step 161) and determines if the received frame is a multicast frame or a unicast frame, based on the DMAC 631 in the L2 header (step 162). If high-order n bits of DMAC 631 (when a following IP packet is IPv4 n=25, and when IPv6 n=16) is in a predetermined pattern (fixed pattern), then the received frame is determined to be a multicast frame.

If the received frame is a unicast frame, the downstream frame analysis unit 122 outputs the received frame to the TC/GEM frame generator 123 as is (step 164), and if a multicast frame, then the downstream frame analysis unit 122 removes the L2 header (step 163) and outputs the received frame to the TC/GEM generator 123.

The OLT controller 100 receives a control frame indicating transmitted data accumulation state or transmitted data length from each ONU-i, and controls the upstream frame transmission time interval to be allocated to each ONU according to an upstream bandwidth management table 130. The upstream frame transmission time interval allocated to each ONU is notified to each ONU by a downstream control frame generated in the OLT controller 100.

The TC/GEM frame generator 123 converts a frame output from the downstream frame analysis unit 122 and a control frame supplied from the OLT controller (such as an OMCI frame or PLOAM frame) into a GEM frame with reference to a GEM header table 150.

The GEM header table 150 has a plurality of table entries that represent a correspondence between DMAC 151 and port ID 152 to be set in the GEM header. For example, for the table entries under the DMAC 151 including MAC addresses "MAC111" and "MAC112" of the user terminal TE-111 and TE-112 respectively shown in FIG. 1, the port ID of the ONU 2001 (ID1) is registered under the port ID 152, and for the table entries including the MAC address "MAC21" of the user terminal TE-21 the port ID of the ONU 20-2 (ID2) is registered under the port ID 152. Also, for the table entries including MAC addresses fro multicast under the DMAC 151, a multicast port ID is listed under the port ID 152.

The TC/GEM frame generator 123, if a frame received from the downstream frame analysis unit 122 does not have an L2 header, determines that the frame is a multicast frame, and adds a GEM header including a multicast port ID registered in the GEM header table 150 to the received frame and output it to the downstream frame transmission controller 124. If the received frame has an L2 header, then TC/GEM frame generator 123 searches in the GEM header table a GEM port ID corresponding to a DMAC indicated by the L2 header, and adds a GEM header including this GEM port ID to the received frame and output it to the downstream frame transmission controller 124.

Figure 9:
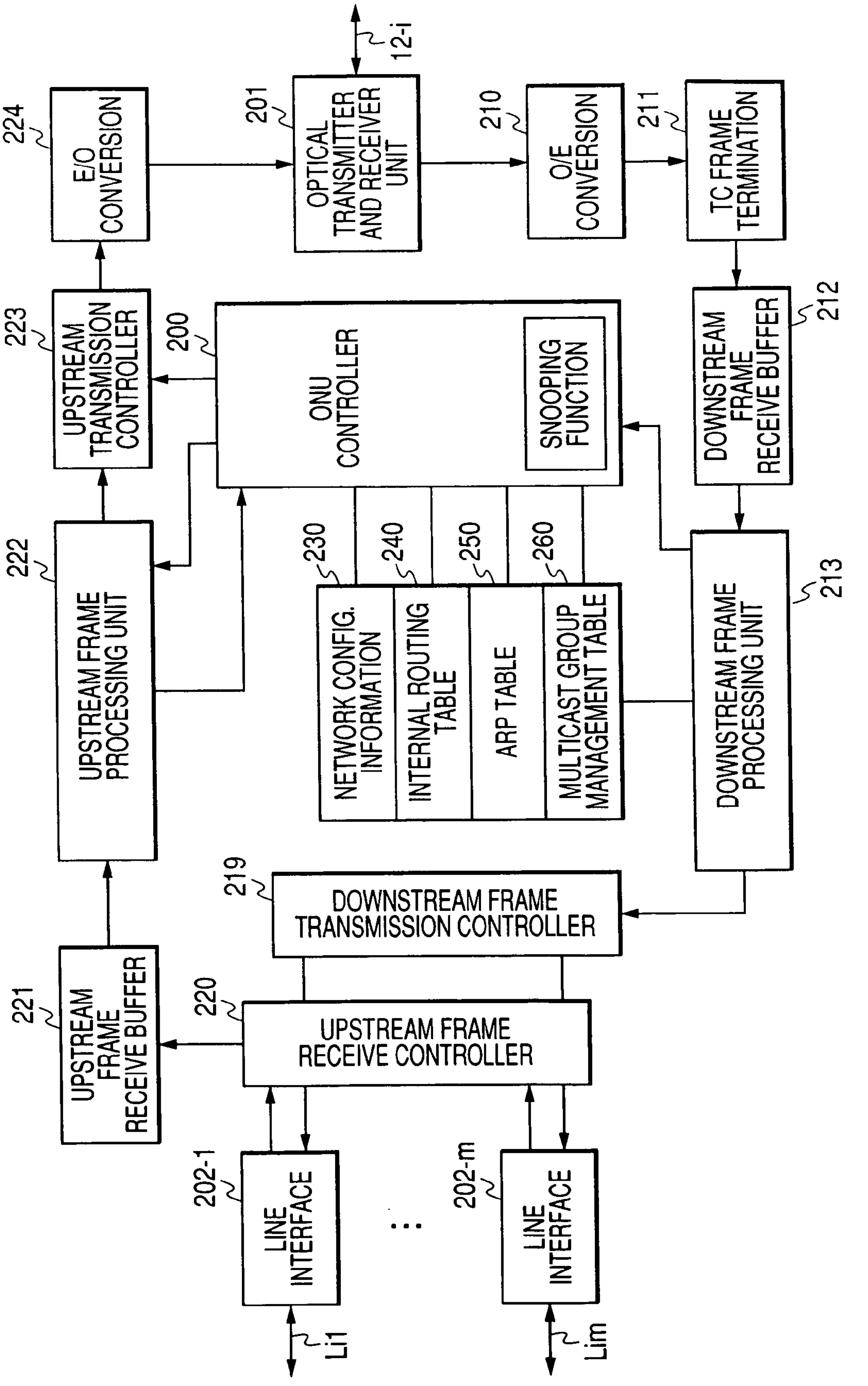
FIG. 9 is a block diagram showing an embodiment of an ONU 20-*i* according to the present invention.

FIG. 9 is a block diagram showing one embodiment of the ONU 20-*i*.

The ONU 20-*i* includes: an ONU controller 200; an optical transmitter and receiver unit 201 connected to the branch optical fiber 12-*i*; a plurality of line interfaces 202-1 to 202-*m* connected to the user terminal connection lines Li1 to Lim respectively; a downstream frame transmission controller 219 and an upstream frame receive controller 220 both of which are connected to the line interfaces; a down stream signal processing circuit provided between the optical transmitter and receiver unit 201 and the downstream frame transmission controller 219; and an upstream signal processing circuit provided between the optical transmitter and receiver unit 201 and the upstream frame receive controller 220.

The downstream signal processing circuit includes: an O/E conversion unit 201 that converts an optical signal received by the optical transmitter and receiver unit 201 into an electric signal; a TC frame termination unit 211 that terminates a GTC frame based on a signal output from the O/E conversion unit 210 and outputs in succession the GEM frames extracted from the GTC payload; a downstream frame buffer 212 to temporarily store GEM frames; and a downstream frame processor 213 that analyzes a GEM frame read out from the downstream frame buffer and outputs, in the frame format with an internal header as shown in FIG. 5, an Ethernet frame extracted from a GEM frame and an Ethernet frame regenerated from an abbreviated GEM frame to the downstream frame processor 213, as described below. The detailed operation of the downstream frame processor 213 is described later with reference to FIG. 13.

The downstream frame transmission controller 219, on receipt of a frame from the downstream frame processor 213, identifies at least on connection line Lij to which the frame is transferred according to the line number Nij indicated by the internal header of the received frame, and transfers a downstream Ethernet frame without the internal header to the line interface 202-*j* corresponding to the identified line.

On the other hand, the upstream signal processing circuit includes: an upstream frame buffer 221 to temporarily store an upstream transmission frame that the upstream frame receive controller 220 received from the line interface 202-1 to 202-*m*; an upstream frame processing unit 222 that reads out a transmission frame from the upstream frame buffer 221, analyzes the header information, and outputs the frame as an upstream frame in the PON section; an upstream transmission controller 223 that sends a transmission frame output from the upstream frame processing unit 222 in the transmission time interval specified by the ONU controller 200; and an E/O conversion unit 224 that converts an output signal from the upstream frame transmission controller into an optical signal and outputs it to the optical transmitter and receiver unit 201.

The upstream frame processing unit 222 determines the type of a frame and whether or not it is to be transmitted based on the header information of the frame, and deletes the frame that is not required to be transmitted. The upstream frame processing unit 222, if a transmission frame is a prespecified type control frame, for example, a multicast frame conforming to the IGMP (Internet Group Management Protocol) or MLD (Multicast Listener Discovery) or an ARP packet frame to inquire a MAC address corresponding to a specified IP address, notifies a copy of the transmission frame to the ONU controller 200. The upstream frame processing unit 222 converts the format of a transmission frame as needed, and outputs the frame to the upstream frame transmission controller 223.

The ONU controller 200 has a memory in which a network configuration information table 230, an internal routing table 240, an ARP table 250, a multicast group management table 260, and the like are stored. In the network configuration information table 230, the network configuration information required by an ONU 20-*i* is set by a PON system administrator or a management system (not shown), when the ONU 20-*i* is connected to the OLT 10. The network configuration information includes at least the address information on a router 40-1 connected to the OLT 10.

As shown in FIG. 10, the internal routing table 240 includes: a destination MAC address (DMAC) 241 of a user terminal housed in the ONU 20-*i*; a plurality of table entries showing the correspondence between the DMAC and the line number 242 to which a user terminal is connected; and a table entry for multicast. In the table entry for multicast, a multicast number specifying all line numbers is set as the line number 242 corresponding to the multicast MAC address 241. The internal routing table 240 is referenced when the downstream frame processing unit 213 identifies a line number to which a frame is transferred and generates an internal header to be attached to a downstream frame.

As shown in FIG. 11, the ARP table 250 includes an IP address 251 and a plurality of table entries showing the correspondence between the IP address 251 and MAC address 252. The table entries of the ARP table 250 are generated by the snooping function of the ONU controller 200 based on the contents of an ARP packet, when a user terminal transmits the ARP packet frame to check, after obtaining an IP address, if the same IP address is also allocated to other user terminals, according to the DHCP (Dynamic Host Configuration Protocol) or RADIUS (Remote Authentication Dial In User Service). The ARP table 250 is referenced by the downstream frame processing unit 213 when selectively transferring an abbreviated GEM frame to a requesting user terminal, as describe below.

As shown in FIG. 12, the multicast group management table 260 includes: a multicast group IP address 261; an IP address of a user participating in a multicast group (IP addresses of participants) 262; a VLAN identifier (VID) 263; and a plurality of entries showing the correspondence between these and other header items. However, the VID 263 is information required when a user terminal uses a VLAN, and is not an information item required for the multicast group management table 260.

The table entries of the multicast group management table 260 is generated by the snooping function of the ONU controller 200 when a user terminal sends a multicast group participation request packet to a server, based on the contents of the participation request packet. The multicast group management table 260 is referenced by the downstream frame processing unit 213 to determine if it is necessary to transfer a downstream multicast frame to a user terminal, as described below. Also, in a modified embodiment of the present invention, the multicast group management table is referenced when the downstream frame processing unit 213 regenerates an L2 header (Ethernet header) from an abbreviated GEM frame.

Figure 13:
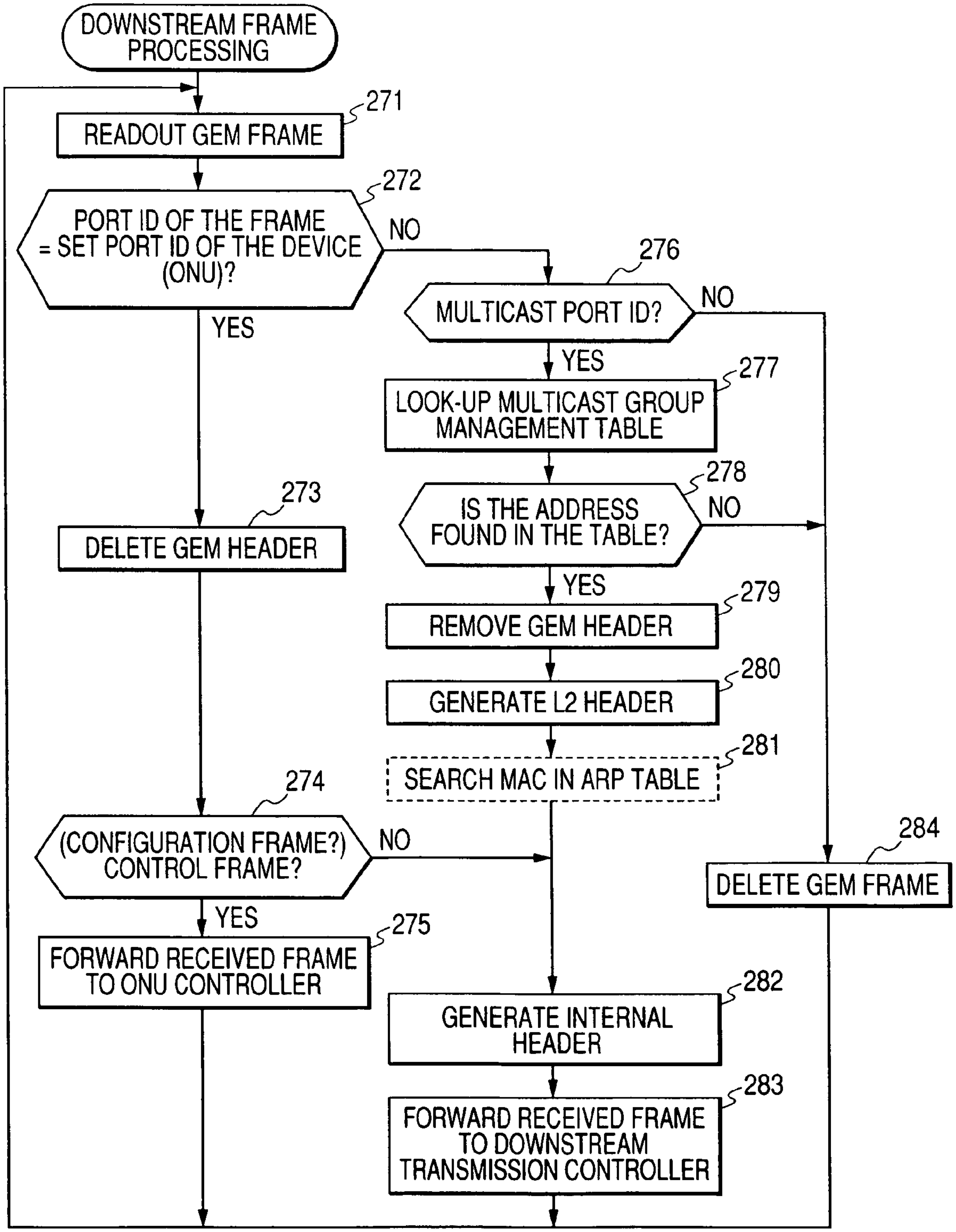
FIG. 13 is a flowchart showing the operation of a downstream frame processing unit 213 of the ONU 20-*i*.

FIG. 13 is a flowchart showing the operation of the downstream frame processing unit.

The downstream frame processing unit 213 reads out a GEM frame from the downstream frame buffer 212 (step 271), and compares a port ID contained in the GEM header 71 with the own port ID (step 272). If both ports match, the GEM frame has an Ethernet frame transmitted from the router 40-1 or a PON control frame transmitted from the OLT 10, in the payload 72. In this case, the downstream frame processing unit 213 removes the GEM header 71 from the GEM frame (step 273), and identifies the type of a received frame contained in the GEM payload (step 274).

When a received frame is a PON control frame, the downstream frame processing unit 213 transfers the received frame to the ONU controller 200 (step 275) and then read out the next GEM frame from the downstream frame buffer 212 (step 271). When a received frame is an Ethernet frame, the downstream frame processing unit 213 searches in the internal routing table 240 a line number 242 corresponding to the DMC 631 indicated by the L2 header of the received frame and generates an internal header containing this line number (step 282), and transfers the received frame with this added internal header to the downstream frame transmission controller 219 (step 283). Then, the downstream processing unit 213 reads out the next GEM frame from the downstream frame buffer 212 (step 271).

If a port ID contained in the GEM header 71 does not agree with the own port ID, the downstream frame processing unit 213 determines whether or not the port ID in the GEM header 71 is a multicast port ID (step 276), and if not a multicast port ID, then deletes the GEM frame (step 284) and reads out the next GEM frame from the downstream frame buffer 212.

If a port ID in the GEM header 71 is a multicast port ID, the GEM frame is an abbreviated frame with the L2 header removed, and contains a multicast IP packet with a multicast group IP address set as the destination IP address (DA) 612.

Each ONU which has received a multicast GEM frame preferably deletes the received packet, if the IP packet contained in the received packet is a packet irrelevant to the user terminals under the control of the ONU. Accordingly, the downstream frame processing unit 213 refers to the multicast group management table 260 (step 277) and determines whether or not a table entry (participant user IP address) corresponding to the multicast group IP address (DA:612) of the received IP packet is registered (278).

If a table entry corresponding to the multicast group IP address is not registered, this ONU has no user terminal which is to receive the abovementioned IP packet. In this case, the downstream frame processing unit 213 deletes the received GEM frame (step 284) and reads out the next GEM frame from the downstream frame buffer (step 271).

If a table entry corresponding to the multicast group IP address of the received packet is registered in the multicast group management table 260, the downstream frame processing unit 213 removes the GEM header from the GEM frame (step 279), and the information indicated by the table entry to regenerate an L2 header 62*m* to be attached to the received IP packet (step 280).

In the destination MAC address (DMAC) in the L2 header 63*m*, a multicast MAC address is set. In this case, the multicast MAC address can be generated by combining the MAC address indicated by the lower M bits (M=23 for IPv4, M=32 for IPv6) of the destination IP address DA (multicast group IP address) 611 of the received packet, as shown in FIG. 5.

To the source MAC address (SMAC) 632 of the L2 header, the MAC address of the router 40-1 is applied that is stored in the network configuration information table 230 in advance. Also, since it is already known that the L2 header is followed by an IP packet (IPv4 or IPv6), a value indicating an IP protocol is set in the protocol type 634 in the L2 header. In the other information 635, information 264 indicated by a retrieved table entry in the multicast group management table 260 is set.

On completion of the L2 header 63*m*, the downstream frame processing unit 213 refers to the internal routing table 240 to generate an internal header 64 to be attached to the Ethernet frame composed of the L2 header and a multicast IP packet (step 282). In the internal header generated here, a multicast number is set. Then, the downstream frame processing unit 213 transfers to the downstream frame transmission controller the multicast frame with the L2 header 63*m* and internal header 64 attached (step 283), and reads out the next GEM frame from the downstream frame buffer 212 (step 271).

The downstream frame transmission controller 219, on receipt of an Ethernet frame from the downstream frame processing unit 213, removes the internal header 64 and transfers the received frame to the line interface 202 identified by a line number indicated by the internal header 64. A multicast frame is transferred to all the line interfaces according to the multicast number indicated by the internal header 64.

In the above embodiment, the multicast frame that the downstream frame processing unit 213 has determined that the frame needs to be transferred as a result of the reference to the multicast group management table 260, is transferred to all the line interfaces 202 connected to the downstream frame transmission controller 219. In this case, since the multicast frame is also transmitted to other than the line to which the receiving user terminal is connected, the multicast frame is delivered to user terminals not participating in the multicast group as well.

In order to limit the destination of a multicast frame to a particular line to which user terminal participating in the multicast group, the ARP table 250 may be used.

For example, the downstream frame processing unit 213, based on the IP addresses of participants 262 (shown by a dotted line in FIG. 13) retrieved from the multicast group management table 260, searches a MAC address 252 in the ARP table 250 (step 281) and a line number 242 corresponding to that MAC address 252 in the internal routing table 240, to generate an internal header to be attached to the multicast frame (step 282).

If a plurality of corresponding IP addresses of participants are registered in the multicast group management table 260, for one multicast group IP address 261, the downstream frame processing unit 213 searches a plurality of line numbers in the internal routing table 240 to generate an internal header 64 containing these plurality of line numbers. Thus, by limiting, with an internal header, the line to which a multicast frame is transferred, it is possible to cause the downstream frame transmission controller 219 to selectively transfer a received frame to a particular line interface 202.

According to the above embodiment, by generating an internal header using the APR table 250 and the internal routing table 240, in the downstream frame processing unit 213, it is possible to selectively transfer a downstream frame with multicast DMAC to a particular line to which a requesting user terminal is connected. However, also in this case, if a plurality of user terminals are connected, via the customer premises router 30, to the line to which a multicast frame is sent, a multicast frame may be transferred to a user terminal other than a user terminal requesting multicast as well.

In order to cause a multicast frame to be only transferred to a multicast requesting user terminal, the downstream frame processing unit 213 may be made to use the IP addresses of participants 262 and ARP table 250 indicated by the multicast group management table 260, to convert a multicast IP packet into a unicast Ethernet frame.

That is, In the above-described embodiment, a multicast MAC address generated from the destination IP address 612 of a received packet is used as the destination MAC address (DMAC) 631 of the L2 frame, but it is possible to use a MAC addresses corresponding to each IP address of multicast participant as DMAC 631, and, if a plurality of multicast participants exist under the control of an ONU, to generate a plurality of Ethernet frames with different DMACs 631. In this case, the downstream frame processing unit 213 uses the MAC address of an IP address of participant retrieved from the ARP table, instead of the multicast MAC address, to generate a plurality of Ethernet frames with internal headers each containing a different line number.

For increased communications security, in a network configuration wherein a user terminal and the router 40-1 communicate Ethernet frames with each other by means of a VLAN, it is possible for the downstream frame processing unit 213 to regenerate an L2 header including the VID 263 by storing the VID 263 in the multicast group management table 260. Using the VID will enable only the user terminal identified by the VID to receive a frame, even when the same frame is multicast to a plurality of user connection lines.

The above embodiment describes a case where the OLT 10 removes the L2 header from a multicast frame, and converts the frame into an abbreviated GEM frame to multicast to the ONU 20-1 to 20-*k*, but it is also possible to cause the OLT 10 to remove the L2 header of a downstream unicast frame as well as a multicast frame and convert it to an abbreviated GEM frame. In this case, the L2 header can be regenerated as in the case of a multicast frame, by causing each ONU, on receipt of a GEM frame with a port ID for unicast, to extracts the destination IP address (DA) 612 form an IP packet contained in the ARP table, and apply the MAC address corresponding to the destination IP address retrieved from the ARP table 250 to the DMAC 631 in the L2 header.

Also, the above embodiment describes a case where the length of a transferred frame in the PON section is reduced and bandwidth is effectively used, by removing the L2 header from a downstream multicast frame from the OLT 10 to the ONU 20, but it is possible to effectively use upstream bandwidth in the PON section also for an ARP frame or IGMP/MLD frame, by, for example, causing the ONU to remove the L2 header and the OLT to generate the L2 header.

Furthermore, in the above embodiment, the OLT 10 removes the L2 header from a frame received from a wide area network, and converts the received frame into a GEM frame with shortened frame length to multicast to the PON section, but it is possible to cause the OLT 10 to remove part of the L2 header and the ONU to leave particular information items in the GEM frame.

Although the above embodiment describes the operation of the PON system when a frame composed of the IP packet 60 and the Ethernet header 63 is received as a downstream frame, the present invention is applicable to a downstream frame containing tunnel type network linkup protocol information, like PPP session identification information or L2TP tunnel identification information.

For example, if the ONU 20 can obtain PPP session information via the snooping function while a protocol procedure for establishing a PPP session is executed between a user terminal connected to the ONU 20 and the router 40-1, and save this information by making it correspond to the user terminal identification information, it is possible to generate a GEM frame with the PPP session identification information further removed. If it is difficult to generate the PPP session information in the ONU 20, the OLT 10 may be made to generate a GEM frame containing the PPP session identification information and the IP packet.

Although the cases where the present invention is applied to the G-PON have been described as embodiments, the present invention is applicable to the GE-PON as well. In this case, LLID (Logical Link ID) is used instead of port ID, for the header of a frame transmitted in the PON section.

What is claimed is:

1. A passive optical network (PON) system including: a plurality of optical network units (ONUs) accommodating a user terminal, an optical line terminal (OLT) being connected to a wide area network and a passive optical network (PON) which connects between the ONUs and the OLT; the OLT transferring a downstream frame received from a communication node equipment in the wide area network to the plurality of ONUs via the PON; and the plurality of ONUs transferring the downstream frame to the user terminal, wherein the downstream frame includes a Layer 2 header and an IP packet, wherein the OLT has a frame analyzing unit that judges whether a downstream frame received from the communication node equipment is a unicast frame or a multicast frame, outputs the downstream frame received from the communication node equipment without conversion when the downstream frame received from the communication node equipment is judged as a unicast frame and removes at least a part of the Layer 2 header information from the downstream frame received from the communication node equipment and outputs the downstream frame whose length is shortened when the downstream frame received from the communication node equipment is judged as a multicast frame; and a frame generating unit that generates a PON frame by adding a PON-specific header to the downstream frame outputted from the frame analyzing unit, and wherein each of the ONUs has a downstream frame processing unit that extracts a downstream frame from the PON frame received via the PON, and adds a Layer 2 header information generated in said each GNU into the downstream frame when at least said part of the Layer 2 header information is removed.

2. The PON system of claim 1, wherein the downstream frame processing unit of said each ONU determines whether or not the PON frame to be processed in said each ONU for receiving the PON frame is included based on the identification information in the PON-specific header of the PON frame received from the OLT, and discards the PON frame when the PON frame does not include the frame to be processed in said each ONU for receiving the PON frame.

3. The PON system of claim 1, wherein the downstream frame processing unit of said each ONU determines whether or not the PON frame contains a multicast IP packet based on the identification information in the PON-specific header of the PON frame received from the OLT, and when it is determined the PON frame contains a multicast IP packet, adds Layer 2 header information generated in said each ONU.

4. The PON system of claim 1, wherein said each ONU holds the address of the participant user terminal for each multicast group, and wherein the downstream frame processing unit of said each ONU determines whether or not the PON frame contains a multicast IP packet based on the identification information in the PON-specific header of the PON frame received from the OLT, and when it is determined the PON frame contains a multicast IP packet, refers to the destination IP address of the multicast IP packet and the address of the participant user terminal held for each multicast group, and when a participant user terminal is not registered in a multicast group identified by the destination IP address, discards the PON frame.

5. The PON system of claim 4, wherein said each ONU transfers the downstream frame judged that the downstream frame contains the multicast IP packet to a line to which a participant user terminal of the multicast group of identified by the destination IP address of the multicast IP packet is connected.

6. The PON system of claim 1, wherein a downstream frame which the OLT received from the communication node equipment contains an Ethernet header as a Layer 2 header.

7. The PON system of claim 1, wherein a downstream frame which the OLT received from the communication node equipment contains an Ethernet header as a Layer 2 header, and wherein the frame analyzing unit of the OLT removes at least a destination MAC address, a source MAC address, and a protocol type from a downstream frame in the information of the Layer 2 header of the downstream frame, and the downstream frame processing unit of said each ONU adds at least a destination MAC address, a source MAC address, and a protocol type generated therein as the Layer 2 header information to the downstream frame extracted from the PON frame received from the OLT via the PON.

8. The PON system of claim 1, wherein the frame analyzing unit of the OLT judges whether the downstream frame is a multicast frame or a unicast frame based on a destination address included in the Layer 2 header of the downstream frame received from the communication node equipment.

9. The PON system of claim 1, wherein the frame generating unit of the OLT generates the PON frame by adding a PON-specific header including a multicast port ID to the downstream frame outputted from the frame analyzing unit, when the downstream frame received from the communication node equipment is judged as a multicast frame.

* * * * *

UNITED STATES PATENT AND TRADEMARK OFFICE
CERTIFICATE OF CORRECTION

PATENT NO. : 7,675,936 B2
APPLICATION NO. : 11/492832
DATED : March 9, 2010
INVENTOR(S) : Mizutani et al.

It is certified that error appears in the above-identified patent and that said Letters Patent is hereby corrected as shown below:

Title Page, insert

-- (30) Foreign Application Priority Data

Mar. 23, 2006 (JP) ..................2006-080537 --.

Signed and Sealed this

Eighteenth Day of May, 2010

David J. Kappos
*Director of the United States Patent and Trademark Office*